(12) United States Patent
Frink et al.

(10) Patent No.: US 11,509,590 B2
(45) Date of Patent: Nov. 22, 2022

(54) DETERMINING NETWORK DEVICE STATISTICS ASSOCIATED WITH FAST COUNTERS AND SLOW COUNTERS

(71) Applicant: Juniper Networks, Inc., Sunnyvale, CA (US)

(72) Inventors: Craig R. Frink, Chelmsford, MA (US); Yongseok Yi, Chapel Hill, NC (US); Weidong Xu, Westford, MA (US); Monte Becker, Hadley, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/178,033

(22) Filed: Feb. 17, 2021

(65) Prior Publication Data

US 2022/0263766 A1 Aug. 18, 2022

(51) Int. Cl.
*H04L 47/25* (2022.01)
*H04L 43/04* (2022.01)
*H04L 43/0829* (2022.01)

(52) U.S. Cl.
CPC .............. *H04L 47/25* (2013.01); *H04L 43/04* (2013.01); *H04L 43/0829* (2013.01)

(58) Field of Classification Search
CPC ..... H04L 47/25; H04L 43/04; H04L 43/0829; H04L 47/10; H04L 43/024; H04L 43/00; H04L 47/31; H04L 47/26; H04L 47/6255; H04L 63/1458; H04L 41/12; H04L 47/2441; H04L 1/0002; H04L 43/022; H04L 49/508; H04L 47/193; H04L 12/40006; H04L 29/06; H04L 47/34; H04L 41/50; H04L 43/026; H04L 43/50; H04L 12/5602; H04L 41/00; H04L 47/27; H04L 65/1069; H04L 41/142; H04L 47/2416; H04L 12/00; H04L 49/3081; H04L 47/28; H04L 65/1026; H04L 43/10; H04L 47/11;
(Continued)

(56) References Cited

U.S. PATENT DOCUMENTS

| 7,644,230 B1 * | 1/2010 | Hughes ............... H04L 67/56 711/117 |
| 7,698,454 B1 * | 4/2010 | Dyckerhoff ......... H04L 47/10 709/228 |

(Continued)

OTHER PUBLICATIONS

Extended European Search Report for Application No. EP21167719.0, dated Oct. 13, 2021, 8 pages.

*Primary Examiner* — Wutchung Chu
(74) *Attorney, Agent, or Firm* — Harrity & Harrity, LLP

(57) ABSTRACT

A network device may receive one or more packets, and may determine a flow control parameter, a rate limiting parameter, and a statistical sampling parameter associated with a slow counter. The network device may determine whether the flow control parameter satisfies a first threshold, whether the rate limiting parameter satisfies a second threshold, and whether the statistical sampling parameter satisfies a third threshold. The network device may identify a counter event associated with one of the one or more packets, and may selectively assign the counter event to a fast counter when at least one of the first threshold, the second threshold, or the third threshold being satisfied, or to the slow counter when none of the first threshold, the second threshold, and the third threshold being satisfied.

20 Claims, 10 Drawing Sheets

(58) Field of Classification Search
CPC ..... H04L 47/2433; H04L 65/103; G06F 5/06; G06F 11/3452; G06F 9/3851; H04J 3/247; H04W 24/02
See application file for complete search history.

(56) References Cited

U.S. PATENT DOCUMENTS

| | | | |
|---|---|---|---|
| 10,177,997 B1* | 1/2019 | Bromberg | H04L 41/06 |
| 10,587,536 B1* | 3/2020 | Kwan | H04L 49/9021 |
| 2003/0061338 A1* | 3/2003 | Stelliga | H04L 47/808 709/224 |
| 2004/0042456 A1* | 3/2004 | Dittmann | H04L 47/50 370/428 |
| 2009/0303879 A1* | 12/2009 | Duffield | H04L 43/026 375/253 |
| 2014/0064293 A1* | 3/2014 | Deisinger | G06F 9/545 370/412 |
| 2014/0064294 A1* | 3/2014 | Deisinger | H04L 49/90 370/412 |
| 2014/0064295 A1* | 3/2014 | Deisinger | H04L 69/22 370/389 |
| 2014/0328196 A1* | 11/2014 | Arad | H04L 41/147 370/252 |
| 2018/0295150 A1* | 10/2018 | Oikarinen | H04L 63/1441 |
| 2020/0213232 A1* | 7/2020 | Srivastava | H04L 47/12 |
| 2021/0011662 A1* | 1/2021 | Debbins | G06F 3/061 |

* cited by examiner

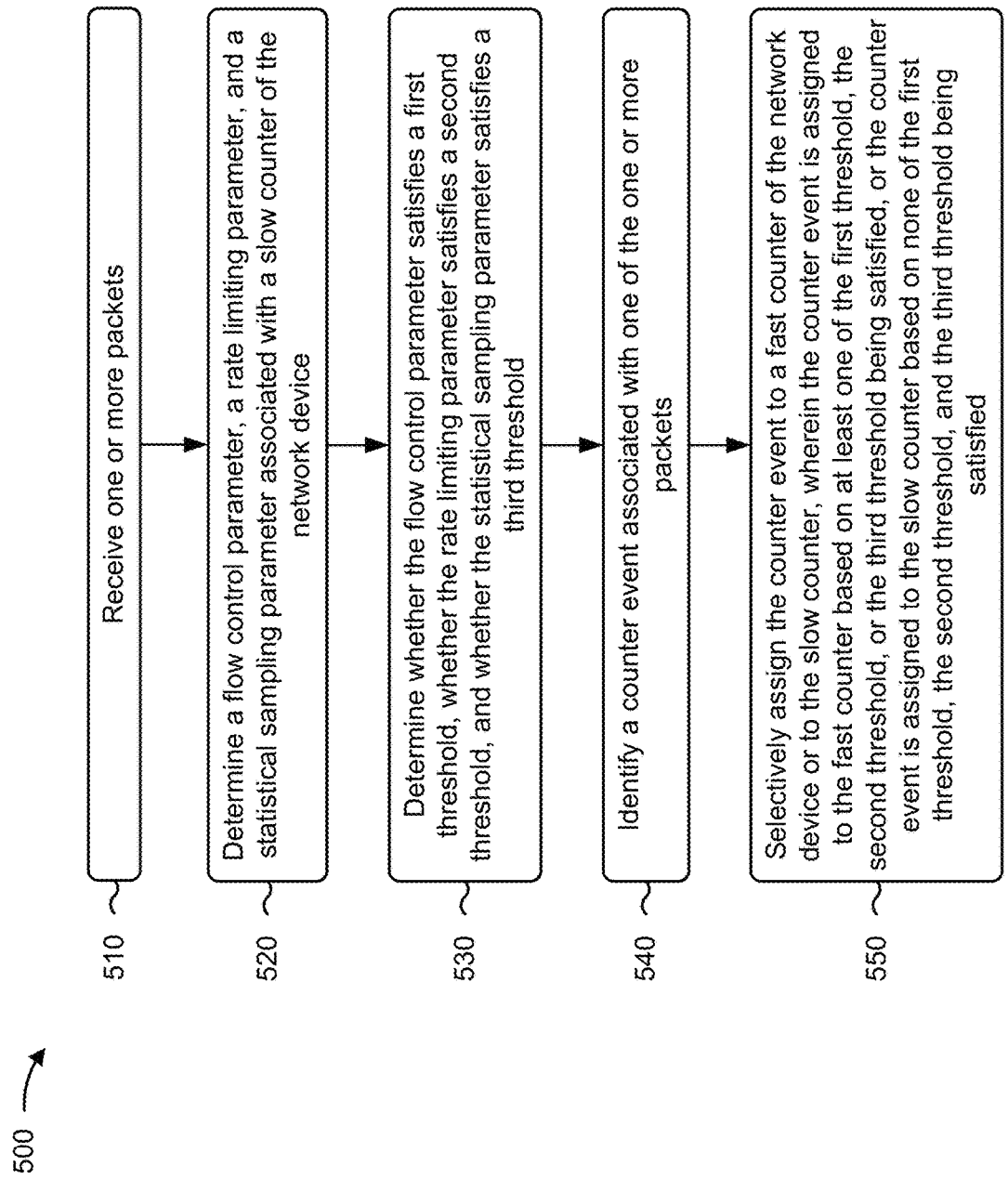

US 11,509,590 B2

DETERMINING NETWORK DEVICE STATISTICS ASSOCIATED WITH FAST COUNTERS AND SLOW COUNTERS

BACKGROUND

Packet and byte counters may be used to maintain statistics for different queues in a network device. The packet and byte counters may maintain, for each queue, information identifying statistics for forwarded packets and dropped packets. Such information may be used to determine a quantity of packet arrivals at the network device. The statistics (for the different queues) may be used to understand a behavior of the network device and/or to enforce customer service level agreements (e.g., related to use of the network device and/or of a network associated with the network device).

SUMMARY

In some implementations, a method may include receiving one or more packets, and determining a flow control parameter, a rate limiting parameter, and a statistical sampling parameter associated with a slow counter of the network device. The method may include determining whether the flow control parameter satisfies a first threshold, whether the rate limiting parameter satisfies a second threshold, and whether the statistical sampling parameter satisfies a third threshold. The method may include identifying a counter event associated with one of the one or more packets, and selectively assigning the counter event to a fast counter of the network device or to the slow counter, wherein he counter event is assigned to the fast counter based on at least one of the first threshold, the second threshold, or the third threshold being satisfied, or the counter event is assigned to the slow counter based on none of the first threshold, the second threshold, and the third threshold being satisfied.

In some implementations, a network device includes one or more memories, and one or more processors to receive a plurality of packets, and determine a flow control parameter, a rate limiting parameter, and a statistical sampling parameter associated with a slow counter of the network device. The one or more processors may determine whether the flow control parameter satisfies a first threshold, whether the rate limiting parameter satisfies a second threshold, and whether the statistical sampling parameter satisfies a third threshold, and may identify a plurality of counter events associated with the plurality of packets. The one or more processors may selectively assign the plurality of counter events to a fast counter of the network device or to the slow counter, wherein one or more of the plurality of counter events are assigned to the fast counter based on at least one of the first threshold, the second threshold, or the third threshold being satisfied, or one or more of the plurality of counter events are assigned to the slow counter based on none of the first threshold, the second threshold, and the third threshold being satisfied.

In some implementations, a non-transitory computer-readable medium may store a set of instructions that includes one or more instructions that, when executed by one or more processors of a network device, cause the network device to receive one or more packets, and determine a flow control parameter, a rate limiting parameter, and a statistical sampling parameter associated with a first counter of the network device, wherein the first counter includes a dynamic random-access memory. The one or more instructions may cause the network device to determine whether the flow control parameter satisfies a first threshold, whether the rate limiting parameter satisfies a second threshold, and whether the statistical sampling parameter satisfies a third threshold, and identify a counter event associated with one of the one or more packets. The one or more instructions may cause the network device to selectively assign the counter event to a second counter of the network device, that includes a static random-access memory, or to the first counter, wherein the counter event is assigned to the second counter based on at least one of the first threshold, the second threshold, or the third threshold being satisfied, or the counter event is assigned to the first counter based on none of the first threshold, the second threshold, and the third threshold being satisfied.

BRIEF DESCRIPTION OF THE DRAWINGS

FIG. 5 is a flowchart of an example process for determining network device statistics associated with fast counters and slow counters.

DETAILED DESCRIPTION

Figure 1A:
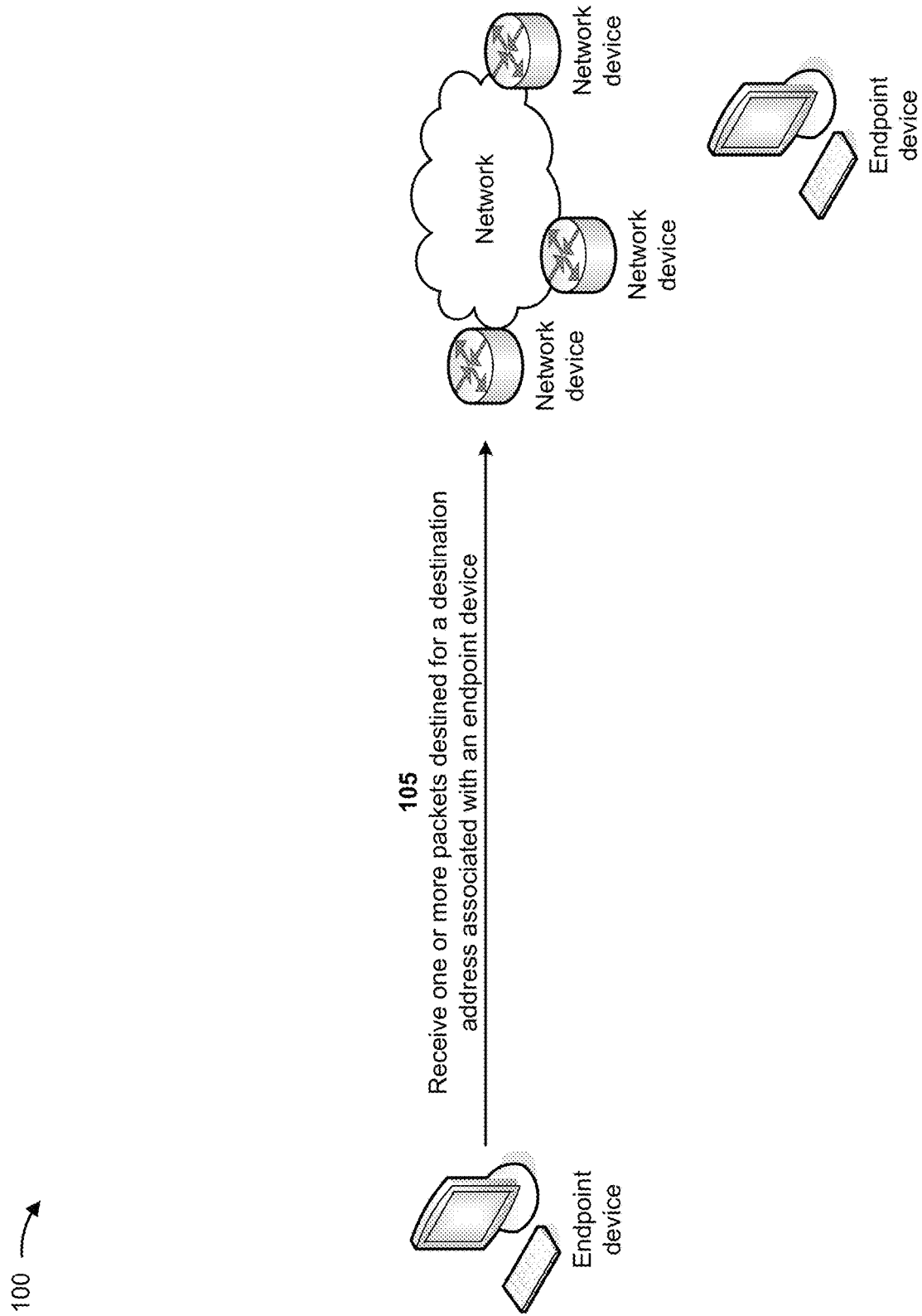
FIGS. 1A-1F are diagrams of an example implementation associated with determining network device statistics associated with fast counters and slow counters.

The following detailed description of example implementations refers to the accompanying drawings. The same reference numbers in different drawings may identify the same or similar elements.

Packet and byte counters (hereinafter referred to as counters) may be used to maintain statistics (e.g., related to a quantity of forwarded packets and dropped packets) for different queues in a network device. The statistics may include different categories such as a category regarding forwarded packets, a category regarding dropped packets, among other examples. The statistics may further include different subcategories, such as a subcategory identifying packets that are forwarded due to the packets being identified as explicit congestion notification (ECN) packets, a subcategory identifying packets that are dropped due to a weighted random early detection (WRED) condition, a subcategory identifying packets that are dropped due to a queue size (or tail drop) limitation, among other examples.

Subcategories may be utilized to determine a category. For example, information regarding the subcategory identifying packets that are dropped due to the WRED condition and the subcategory identifying packets that are dropped due to the queue size limitation may be utilized to determine information regarding the category regarding dropped packets (e.g., to determine a quantity of dropped packets). The subcategories may be used to gain insight into an operation of the network device as well as gain insight into an operation of a network in which the network device resides.

The network device may utilize fast counters and slow counters to maintain the statistics. A fast counter may be implemented using a static random-access memory (SRAM). A fast counter may perform an update (e.g., by incrementing a quantity of packets) after an occurrence of each counter event that is to be accounted for by the fast counter. Accordingly, the fast counter may be considered deterministic. A counter event may include an event associated with the network device dropping a packet or an event associated with the network device forwarding a packet toward a destination of the packet. A slow counter may be implemented using a dynamic random-access memory (DRAM) and may perform an update at a rate that is slower than a rate at which the fast counter performs the update. The slow counter may be considered non-deterministic because the slow counter may experience a backlog, which may prevent the slow counter from performing an update (e.g., by incrementing a quantity of packets) after an occurrence of each counter event that is to be accounted for by the slow counter.

While the performance of fast counters is desirable, a size of an SRAM limits a number of fast counters that may be implemented using the SRAM. Conversely, a size of a DRAM enables a large number of slow counters to be implemented using the DRAM. The large scale and low cost of the slow counters may make slow counters more desirable than fast counters. For example, a network device requiring a rich set of statistics may utilize slow counters. However, slow counters may experience a backlog and, as a result, may experience decreased performance and may be unable to perform an update after an occurrence of each counter event.

By being unable to perform an update after the occurrence of each counter event, the slow counters may not account for all counter events (e.g., thereby resulting in lost counter events). Accordingly, the slow counters may generate an inaccurate count of packets, which may cause incorrect statistics to be generated. Thus, current techniques for determining network device statistics using slow counters waste computing resources (e.g., processing resources, memory resources, communication resources, and/or the like), network resources, and/or other resources associated with generating incorrect statistics (e.g., due to lost counter events, performing incorrect or unnecessary actions on the network device based on the incorrect statistics, taking actions to rectify the incorrect or unnecessary actions, among other examples).

Some implementations described herein relate to a network device that determines network device statistics associated with fast counters and slow counters. For example, the network device may receive one or more packets, and may determine a flow control parameter, a rate limiting parameter, and a statistical sampling parameter associated with a slow counter of the network device. The network device may determine whether the flow control parameter satisfies a first threshold, whether the rate limiting parameter satisfies a second threshold, and whether the statistical sampling parameter satisfies a third threshold, and may identify a counter event associated with one of the one or more packets. The network device may selectively assign the counter event to a fast counter of the network device or to the slow counter. The counter event may be assigned to the fast counter based on at least one of the first threshold, the second threshold, or the third threshold being satisfied, or the counter event may be assigned to the slow counter based on none of the first threshold, the second threshold, and the third threshold being satisfied.

As explained herein, the network device may implement a hybrid counting method that utilizes a combination of fast counters and slow counters to maintain statistics associated with forwarded packets and dropped packets of the network device. The network device may utilize a fast counter in combination with one or more slow counters to accurately account for the statistics associated with forwarded packets and dropped packets. The fast counter may act as a backup counter for the one or more slow counters and may prevent lost counter events.

The fast counter may perform an update (on behalf of the one or more slow counters) to account for counter events (that are supposed to be accounted for by the one or more slow counters) when the one or more slow counters are unable to perform updates (e.g., with respect to the counter events) and unable to maintain full performance (e.g., due to a backlog). With the fast counter acting as the backup counter in this manner, the network device may be able to accurately account for counter events associated with various categories of statistics and/or various subcategories of statistics and, therefore, accurately account for forwarded packets and dropped packets. Accordingly, the network device may conserve computing resources, network resources, and/or other resources that would have otherwise been used with respect to generating incorrect statistics (e.g., due to lost counter events), performing incorrect or unnecessary actions on the network device based on the incorrect statistics, taking actions to rectify the incorrect or unnecessary actions, among other examples.

FIGS. 1A-1F are diagrams of an example implementation 100 associated with determining network device statistics associated with fast counters and slow counters. As shown in FIGS. 1A-1F, example implementation 100 includes endpoint devices associated with a network that includes multiple network devices. Each of the endpoint devices may include a wireless communication device, a mobile phone, a user equipment, a laptop computer, a tablet computer, a desktop computer, among other examples, as described herein. Each of the network devices may include a router, a gateway, a switch, a firewall, a hub, a bridge, a reverse proxy, among other examples. Although FIGS. 1A-1F describe a network device interacting with a single endpoint device, in some implementations, the network device may interact with multiple endpoint devices in a similar manner.

As shown in FIG. 1A, and by reference number 105, a network device may receive one or more packets destined for a destination address associated with an endpoint device. For example, the network device may receive the one or more packets from a first endpoint device and the one or more packets may be destined for the destination address of a second endpoint device. The destination address may include a network address, an Internet protocol address, among other examples. In some examples, the network device may receive the one or more packets periodically, in response to a request, based on a trigger (e.g., the first endpoint device connecting to the network), among other examples. The one or more packets may include a packet that is an explicit congestion notification marked and is to be forwarded by the network device, a packet that is to be dropped by the network device based on a weighted random early detection (WRED) condition (e.g., per-color WRED condition), and/or a packet that is to be dropped by the network device based on a queue size limitation.

The network device may include a plurality of queues for storing (e.g., temporarily) the one or more packets prior to the one or more packets being dropped or forwarded by the network device. The network device may further include counters (e.g., packet and byte counters) that are configured to maintain statistics regarding packets that are dropped by the network device (e.g., count a quantity of packets that are dropped by the network device) and packets that are forwarded by the network device (e.g., count a quantity of packets that are forwarded by the network device). The statistics may include different categories such as a category regarding forwarded packets, a category regarding dropped packets, among other examples. The counters may be used to maintain different subcategories of the categories.

For example, a first counter may maintain a first subcategory of the category regarding dropped packets (e.g., count a quantity of packets that are dropped due to a WRED condition being satisfied), a second counter may maintain a second subcategory of the category regarding dropped packets (e.g., count a quantity of packets that are dropped due to a queue size limitation (or tail drop condition) being satisfied), a third counter may maintain a third subcategory of the category regarding forwarded explicit congestion notification (ECN) packets (e.g., count packets that are forwarded due to the packets being ECN packets), and so on. In some examples, the subcategories (of the category regarding dropped packets) may include different subcategories of different types of WRED conditions. In some implementations, the subcategories (discussed above) may correspond to frequent reasons for dropping packets and/or forwarding packets. The above categories and subcategories are merely provided as examples. Other examples of categories and subcategories may be used in some situations.

The counters may include fast counters and slow counters. Fast counters may be implemented using a static random-access memory (SRAM). Fast counters may perform an update (e.g., by incrementing a quantity of packets) after an occurrence of each counter event that are to be accounted for by the fast counters. A counter event may include an event associated with the network device dropping a packet or an event associated with the network device forwarding a packet toward a destination of the packet. Slow counters may be implemented using a dynamic random-access memory (DRAM) and may perform updates (e.g., by incrementing a quantity of packets) at a rate that is slower than a rate at which fast counters are updated. As explained herein, fast counters may serve as backups for slow counters and may perform updates on behalf of the slow counters when the slow counters are unable to perform updates (e.g., due to backlogs) to account for counter events that are to be accounted for by the slow counters.

Figure 1B:
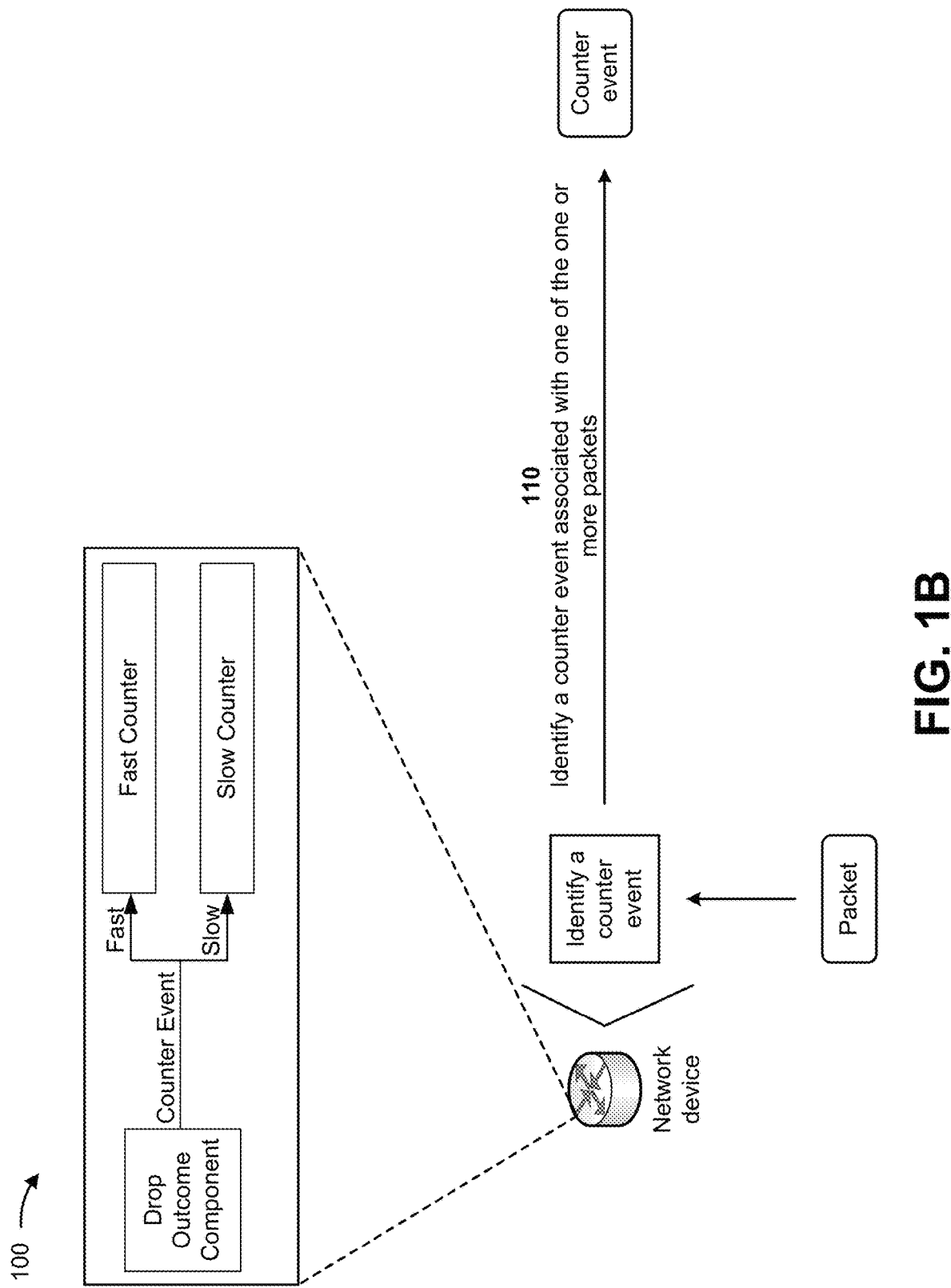

As shown in FIG. 1B, and by reference number 110, the network device may identify a counter event associated with one of the one or more packets. For example, the network device may identify the counter event by determining whether the packet is to be dropped or forwarded toward the destination address of the second endpoint device. In some examples, the network device may determine whether the packet is to be dropped. The network device may determine that the packet is to be dropped for various reasons (e.g., including reasons associated with a queue, of the network device, that temporarily stores the packet until the packet is dropped or forwarded). For example, the network device may determine whether a WRED condition (e.g., associated with a size of the queue) is satisfied, if a queue size limitation (e.g., associated with the size of the queue) is satisfied, among other reasons.

The WRED condition may be satisfied when the size satisfies a first threshold size. The queue size limitation may be satisfied when the size satisfies a second threshold size that exceeds the first threshold size. The network device may determine that the packet is to be dropped if the WRED condition is satisfied and/or if the queue size limitation is satisfied. The counter event associated with the packet being dropped due to the WRED condition may be referred to as a drop event, and more specifically a WRED drop event. The counter event associated with the packet being dropped due to the queue size limitation may be referred to as a drop event, and more specifically a queue size drop event.

In some examples, the network device may determine whether the packet is to be forwarded toward the destination address. The network device may determine whether the packet is to be forwarded toward the destination address for one or more reasons. As an example, the network device may determine that the packet is to be forward if the packet is identified as an ECN packet. The counter event associated with forwarding an ECN packet may be referred to as a forwarding event, and more specifically an ECN forwarding event.

As shown in FIG. 1B, in some implementations, the network device may include a drop outcome component that may determine the counter event associated with the packet. In some examples, the drop outcome component may determine the counter event based on one or more inputs. The one or more inputs may include information from an ingress drop control (IDC) component. The information may indicate whether the packet is to be dropped or forwarded and may indicate a reason for dropping or forwarding the packet. In some instances, if the reason for dropping the packet includes the WRED condition being satisfied, the one or more inputs may include information identifying an offset associated with the WRED condition. In some examples, the offset may indicate a type of WRED condition. In some instances, if the packet is to be forwarded because the packet is an ECN packet, the one or more inputs may include information indicating that the packet is an ECN packet.

The drop outcome component may generate information regarding the counter event based on the one or more inputs. The information regarding the counter event may include information identifying the counter event, information identifying a slow counter that is configured to count packets associated with WRED drop events, information identifying a fast counter that may be used in conjunction with the slow counter (e.g., used as a backup counter to count packets associated with WRED drop events when the slow counter is unable count such packets), among other examples. The information identifying the slow counter may include an address (e.g., within the network device) of the slow counter and the information identifying the fast counter may include an address (e.g., within the network device) of the fast counter.

As shown in FIG. 1B, the slow counter may be implemented using a first interface (e.g., including a first-in, first-out (FIFO) memory) and the fast counter may be implemented using a second interface (e.g., including a FIFO memory). In some implementations, the slow counter and the fast counter may be implemented using a single interface (e.g., including a FIFO memory). The slow counter and the fast counter may be associated with maintaining different subcategories of statistics. For example, the slow counter may be configured to count packets associated with one subcategory of statistics while the fast counter may be configured to count packets associated with another subcategory of statistics. In some examples, the slow counter and the fast counter may be associated with a same category of statistics (e.g., the category regarding dropped packets or the category regarding forwarded packets).

Assume that the slow counter is configured to maintain the first subcategory of the category regarding dropped packets (e.g., configured to count a quantity of packets that are dropped due to the WRED condition being satisfied). Further assume that the network device (e.g., via the drop outcome component) determines that the packet is to be dropped (e.g., due to the WRED condition being satisfied). Further assume that the information regarding the counter event indicates that the counter event is a WRED drop event, that the slow counter has been selected as a primary counter to maintain the first subcategory of the category regarding dropped packets, and that the fast counter has been selected in conjunction with the slow counter (e.g., as a backup counter). Due to the counter event being a WRED drop event, the network device may initially determine that the counter event is to be assigned to the slow counter (e.g., to cause the slow counter to update (or increment) the quantity of packets that are dropped due to the WRED condition being satisfied). The packets that are dropped due to the WRED condition being satisfied may hereinafter be referred to as WRED dropped packets.

In some implementations, the fast counter may be configured as a fast counter dedicated to the slow counter (e.g., dedicated to a backup counter for the slow counter). In some implementations, the fast counter may be configured as a backup counter for multiple slow counters. In the example herein, assume that the fast counter is configured to maintain the second subcategory of the category regarding dropped packets (e.g., configured to count a quantity of packets that are dropped due to the queue size limitation being satisfied).

Figure 1C:
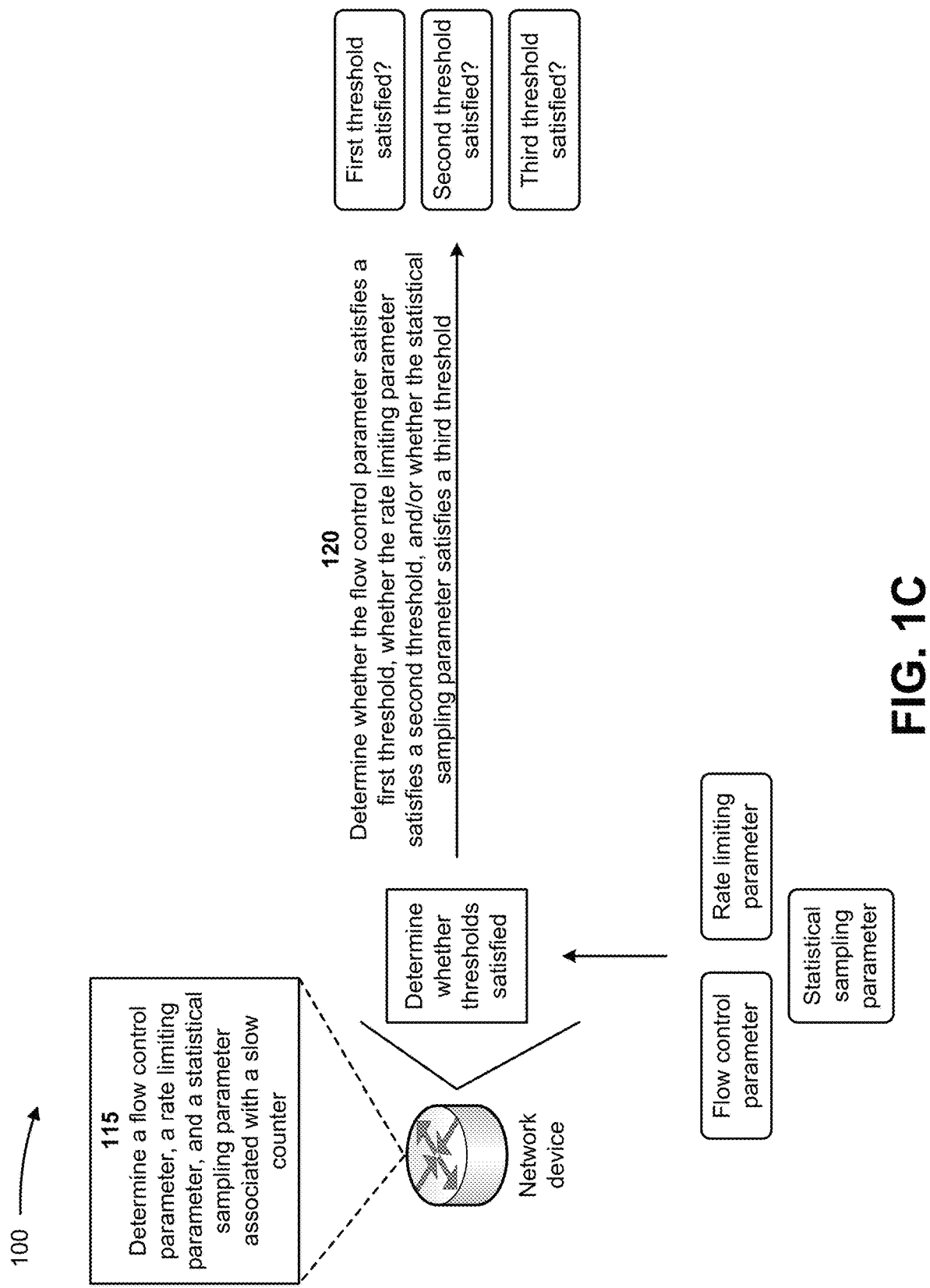

As shown in FIG. 1C, and by reference number 115, the network device may determine a flow control parameter, a rate limiting parameter, and a statistical sampling parameter (collectively referred to as parameters) associated with the slow counter. The parameters may be determined by the network device, the slow counter, another component of network device, among other examples. In some examples, one or more of the parameters may be determined based on data (e.g., historical and/or current) regarding when WRED drop events occur, when the quantity of WRED dropped packets are updated based on occurrences of the WRED drop events, among other examples. The parameters may be determined after the slow counter performs an update (e.g., to update the quantity of WRED dropped packets), after the slow counter receives an indication that the slow counter has been selected to perform the update, after the indication is generated, among other examples. In some examples, the parameters may be obtained from a memory associated with the slow counter.

The flow control parameter may include a value that indicates whether the slow counter is able to perform an update (e.g., to update the quantity of WRED dropped packets) at a rate at which WRED drop events are occurring. The rate limiting parameter may be include a value that identifies a rate (e.g., a current rate) at which the slow counter performs an update (e.g., to update the quantity of WRED dropped packets).

The statistical sampling parameter may include a value (e.g., a random number) that indicates a probability that the counter event will be assigned to the slow counter. In some examples, the random number may be associated with the packet, the counter event, among other examples. The network device may use one or more of the parameters to determine whether the counter event (e.g., the WRED drop event) is to be assigned to the fast counter (instead of the slow counter) in order to maintain an accurate count of the quantity of WRED dropped packets, as explained in more detail below. In some examples, the counter event may be assigned to the fast counter (instead of the slow counter) when the slow counter is unable to perform the update to account for the counter event.

As shown in FIG. 1C, and by reference number 120, the network device may determine whether the flow control parameter satisfies a first threshold, whether the rate limiting parameter satisfies a second threshold, and/or whether the statistical sampling parameter satisfies a third threshold. The network device may obtain information identifying the first threshold, information identifying the second threshold, and/or information identifying the third threshold from one or more memories of the network device (e.g., a memory associated with slow counter). In some implementations, the network device may compare the flow control parameter and the first threshold to determine whether the flow control parameter satisfies the first threshold. The first threshold may include a value that indicates that the slow counter is unable to perform the update (e.g., to update the quantity of WRED dropped packets) at a rate at which WRED drop events are occurring.

In some implementations, the network device may compare the rate limiting parameter and the second threshold to determine whether the rate limiting parameter satisfies the second threshold. In some examples, the second threshold may include a value that identifies a rate limit. In some implementations, the second threshold (e.g., the rate limit) may be determined based on a frequency (or expected frequency) of utilization of the slow counter (e.g., frequency of utilization with respect to updating the quantity of WRED dropped packets). For example, a first frequency of utilization of the slow counter may be associated with a first value that identifies a first rate limit, a second frequency of utilization of the slow counter may be associated with a second value that identifies a second rate limit, a third frequency of utilization of the slow counter may be associated with a third value that identifies a third rate limit, and so on.

The second frequency may exceed the first frequency and the third frequency may exceed the second frequency. Accordingly, the second value may exceed the first value and the third value may exceed the second value. In some examples, the frequency of utilization of the slow counter may be based on data (e.g., historical and current) such as historical and/or current WRED drop events, historical and/or current rates at which WRED drop events occur, historical and/or current rates at the quantity of WRED dropped packets is updated, among other examples.

In some implementations, the second threshold (e.g., the rate limit) may be determined based on a maximum value (e.g., maximum possible value) for the rate at which the slow counter performs the update (e.g., to update the quantity of WRED dropped packets). As an example, the first value may be based on a first portion of the maximum value (e.g., a first percentage of the maximum value), the second value may be based on a second portion of the maximum value (e.g., a second percentage of the maximum value), and so on.

In some implementations, the network device may compare the statistical sampling parameter and the third threshold to determine whether the statistical sampling parameter satisfies the third threshold. The third threshold may include a value identifying a sample probability that indicates a quantity of times that the slow counter is to perform the update (e.g., to update the quantity of WRED dropped packets) out of a quantity of WRED drop events.

For example, if the sample probability is 10% (ten percent), each time a WRED drop event occurs, the slow counter will perform the update 10% (ten percent) of the time and the fast counter will perform an update 90% (ninety percent) of the time. For instance, the slow counter will perform the update for 10 (ten) WRED drop events out of 100 (hundred) WRED drop events. In this regard, the sample probability may cause the slow counter to perform the update for a portion of the quantity of WRED drop events.

The above percentages are merely provided as examples. Other examples of percentages may be used in some situations. In some implementation, the sample probability may be determined based on data (e.g., historical and/or current) regarding a quantity of drop events, a quantity of WRED drop events, a rate at which WRED drop events occur, a rate at which the slow counter performs updates, among other examples.

Figure 1D:
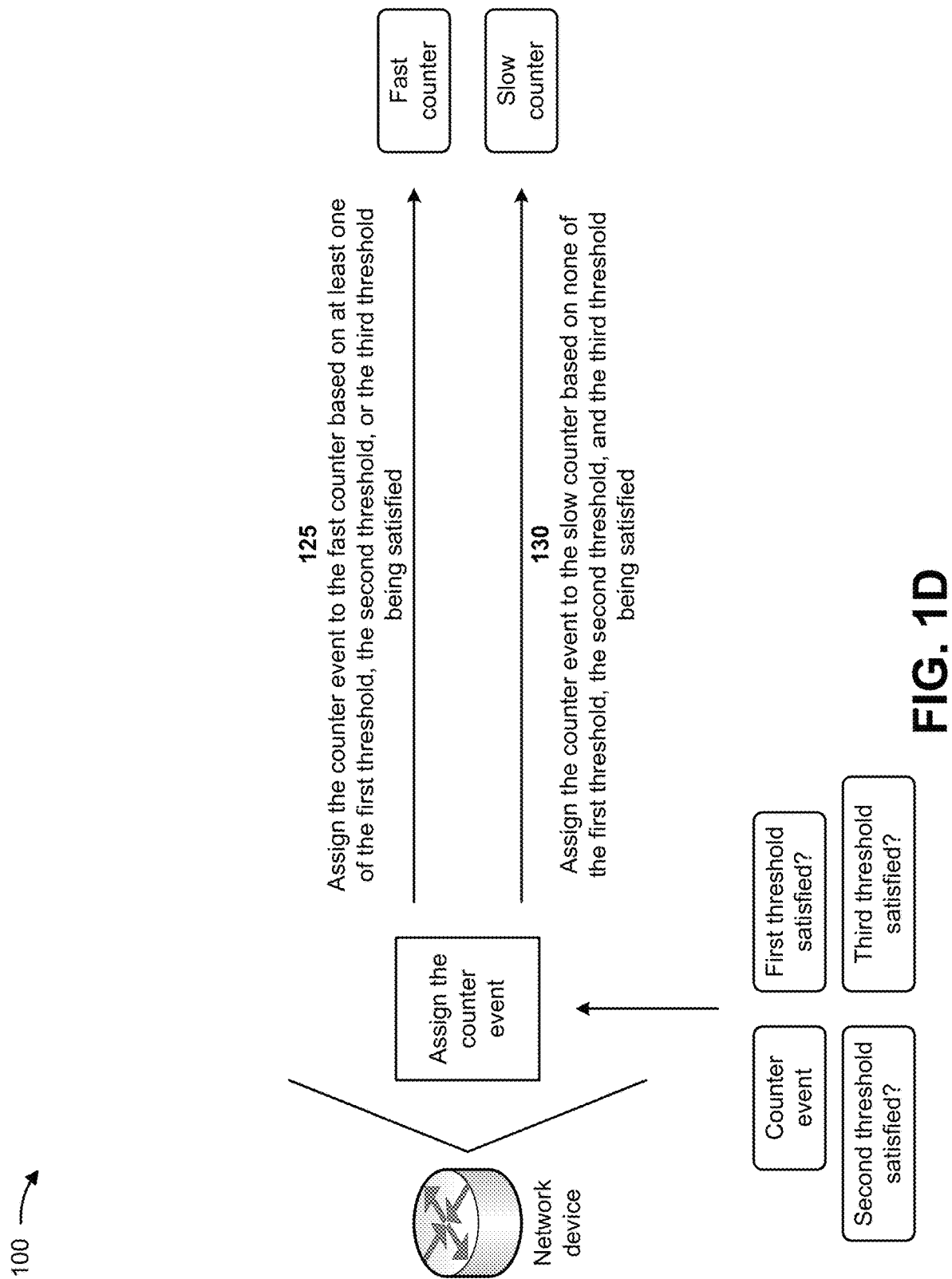

As shown in FIG. 1D, and by reference number 125, the network device may assign the counter event to the fast counter based on at least one of the first threshold, the second threshold, or the third threshold being satisfied. For example, the network device may select the fast counter to account for the counter event (e.g., the WRED drop event) when the flow control parameter satisfies the first threshold. In other words, the network device may select the fast counter when the flow control parameter indicates that the slow counter is unable to perform the update (e.g., to update the quantity of WRED dropped packets) at the rate at which WRED drop events are occurring.

In some examples, the slow counter may be unable to perform the update at the rate at which WRED drop events are occurring when the slow counter is unable to access a memory (e.g., associated with the DRAM) to perform the update at such rate. The inability to access the memory, as described above, may be referred to as a counter contention condition. In some examples, the counter contention condition may cause a backlog with respect to updating the quantity of WRED dropped packets to account for one or more WRED drop events that have occurred.

Accordingly, the counter contention condition may cause the quantity of WRED dropped packets to be inaccurate. The counter contention condition may also cause reduced performance for the slow counter (e.g., due the slow counter being unable to update the quantity of WRED dropped packets). The network device may prevent the counter contention condition from occurring by assigning the counter event to the fast counter when the flow control parameter satisfies the first threshold. In some implementations, the network device may maintain information identifying counter events assigned to the slow counter in effort to prevent a counter contention condition and to limit an accumulation of counter events assigned to the slow counter.

Additionally, or alternatively, to selecting the fast counter when the flow control parameter satisfies the first threshold, the network device may select the fast counter to account for the counter event when the rate limiting parameter satisfies the second threshold (e.g., when the rate at which the slow counter performs the update satisfies the rate limit). In some examples, the second threshold may be configured to prevent the counter contention condition from occurring. In this regard, the network device may prevent the counter contention condition from occurring by assigning the counter event to the fast counter when the rate limiting parameter satisfies the second threshold.

Additionally, or alternatively, to selecting the fast counter when the rate limiting parameter satisfies the second threshold, the network device may select the fast counter to account for the counter event when the statistical sampling parameter satisfies the third threshold (e.g., when the random number satisfies the sample probability). The random number may be generated such that the slow counter performs the update (for WRED drop events) in accordance with the sampling probability.

When accounting for the counter event, the fast counter may update (e.g., increment) the quantity of packets that are dropped due to the queue size limitation being satisfied (e.g., by incrementing a counter value of the fast counter). In some implementations, the network device may store (e.g., in a memory associated with the fast counter) information identifying a quantity of counter events assigned to the fast counter (e.g., assigned due to the slow counter being unable to perform the update). The network device (and/or the fast counter) may update (e.g., increment) the quantity of counter events assigned to the fast counter based on assigning the counter event to the fast counter.

As shown in FIG. 1D, and by reference number 130, the network device may assign the counter event to the slow counter based on none of the first threshold, the second threshold, and the third threshold being satisfied. For example, the network device may cause the slow counter to perform the update (e.g., to update (or increment) the quantity of WRED dropped packets) to account for the counter event (e.g., the WRED drop event) when the flow control parameter does not satisfy the first threshold, when the rate limiting parameter does not satisfy the second threshold, and when the statistical sampling parameter satisfies the third threshold.

Figure 1E:
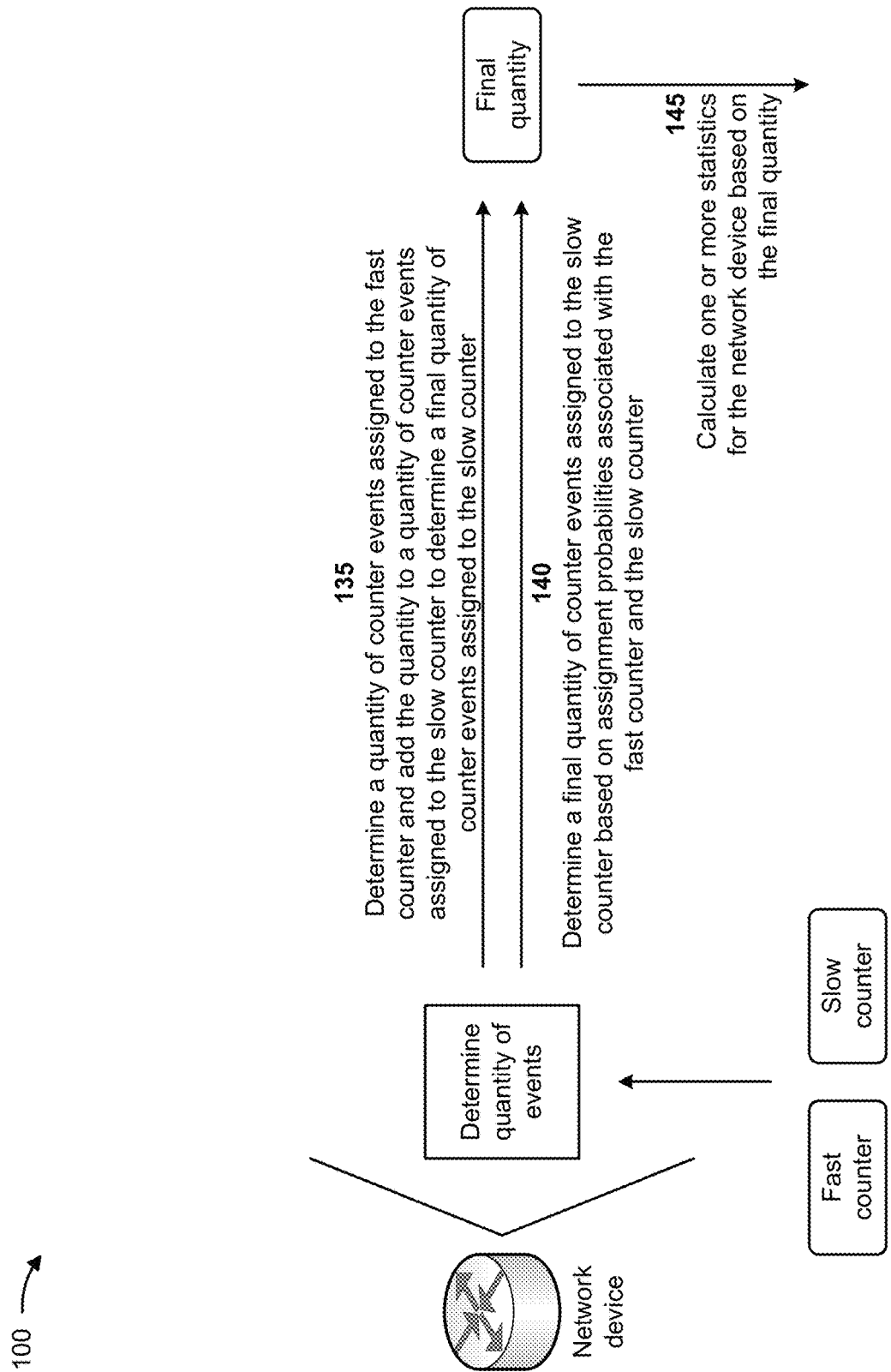

As shown in FIG. 1E, and by reference number 135, the network device may determine a quantity of counter events assigned to the fast counter and add the quantity to a quantity of counter events assigned to the slow counter to determine a final quantity of counter events assigned to the slow counter. For example, assume that the network device has received a request to calculate one or more statistics of the network device. The request may be received from a device of an administrator associated with the network device, a device of an administrator associated with the network, among other examples.

Based on receiving the request, the network device may obtain the information identifying the quantity of counter events assigned to the fast counter (e.g., from the memory associated with the fast counter). The network device may obtain information identifying a quantity of counter events assigned to the slow counter. For example, the network device may obtain the information identifying the quantity of WRED dropped packets (e.g., from the memory associated with the slow counter). Assume that the fast counter is a fast counter dedicated to the slow counter. In other words, assume that the fast counter does not serve as a backup counter for another slow counter and, accordingly, only accounts for counter events associated with the slow counter. The network device may add the quantity of counter events assigned to the fast counter to the quantity of counter events assigned to the slow counter (e.g., the quantity of WRED dropped packets being satisfied) to calculate the final quantity of counter events assigned to the slow counter.

As shown in FIG. 1E, and by reference number 140, the network device may determine a final quantity of counter events assigned to the slow counter based on assignment probabilities associated with the fast counter and the slow counter. For example, based on receiving the request to calculate the one or more statistics of the network device, the network device may obtain information identifying the assignment probabilities associated with the fast counter and the slow counter. For example, the network device may obtain information identifying the sample probability from the one or more memories of the network device. The network device may obtain the information identifying the quantity of counter events assigned to the slow counter in a manner similar to the manner described above. The network device may use the sample probability and the quantity of counter events assigned to the slow counter to determine a final quantity of counter events assigned to the slow counter.

For example, assume that the sample probability is 10% (ten percent). In other words, assume that the sample probability indicates that 10% of the WRED drop events are to be assigned to the slow counter and that 90% (ninety percent) of the WRED drop events are to be assigned to the fast counter. Further, assume that the quantity of counter events assigned to the slow counter is 100 (hundred). Based on the sample probability and the quantity of counter events assigned to the slow counter, the network device may determine that nine hundred (900) counter events (out of the counter events accounted for by the fast counter) are to be added to the quantity of counter events assigned to the slow counter. As an example, the network device may determine that the counter events assigned to the fast counter includes 90% (ninety percent) of the WRED drop events and 100% (hundred percent) of the queue size drop event (e.g., if the fast counter has been configured to account for queue size drop events). Based on determining that the nine hundred (900) counter events are to be added to the quantity of counter events assigned to the slow counter, the network device may determine that the final quantity of counter assigned to the slow counter is one thousand (1000) counter events. The above percentages and quantities are merely provided as examples. Other examples of percentages and quantities may be used in some situations.

As shown in FIG. 1E, and by reference number 145, the network device may calculate one or more statistics for the network device based on the final quantity. For example, the network device may use the final quantity of counter events assigned to the slow counter (as discussed above) to calculate a statistic associated with packets that are dropped by the network device. For instance, the network device may combine the final quantity of counter events with one or more quantities of counter events (e.g., other types of drop events) assigned to one or more other counters to calculate the statistic associated with packets that are dropped by the network device.

The one or more other counters may include one or more slow counters and/or one or more fast counters that are configured to maintain statistics associated with different subcategories of the category regarding dropped packets. In some implementations, if the slow counter is configured to maintain a statistic of a subcategory of the category regarding forwarded packets (e.g., configured to count a quantity of packets that are forwarded due to the packets being ECN packets), the network device may use the final quantity of counter events assigned to the slow counter (as discussed above) to calculate a statistic associated with packets that are forwarded by the network device.

Figure 1F:
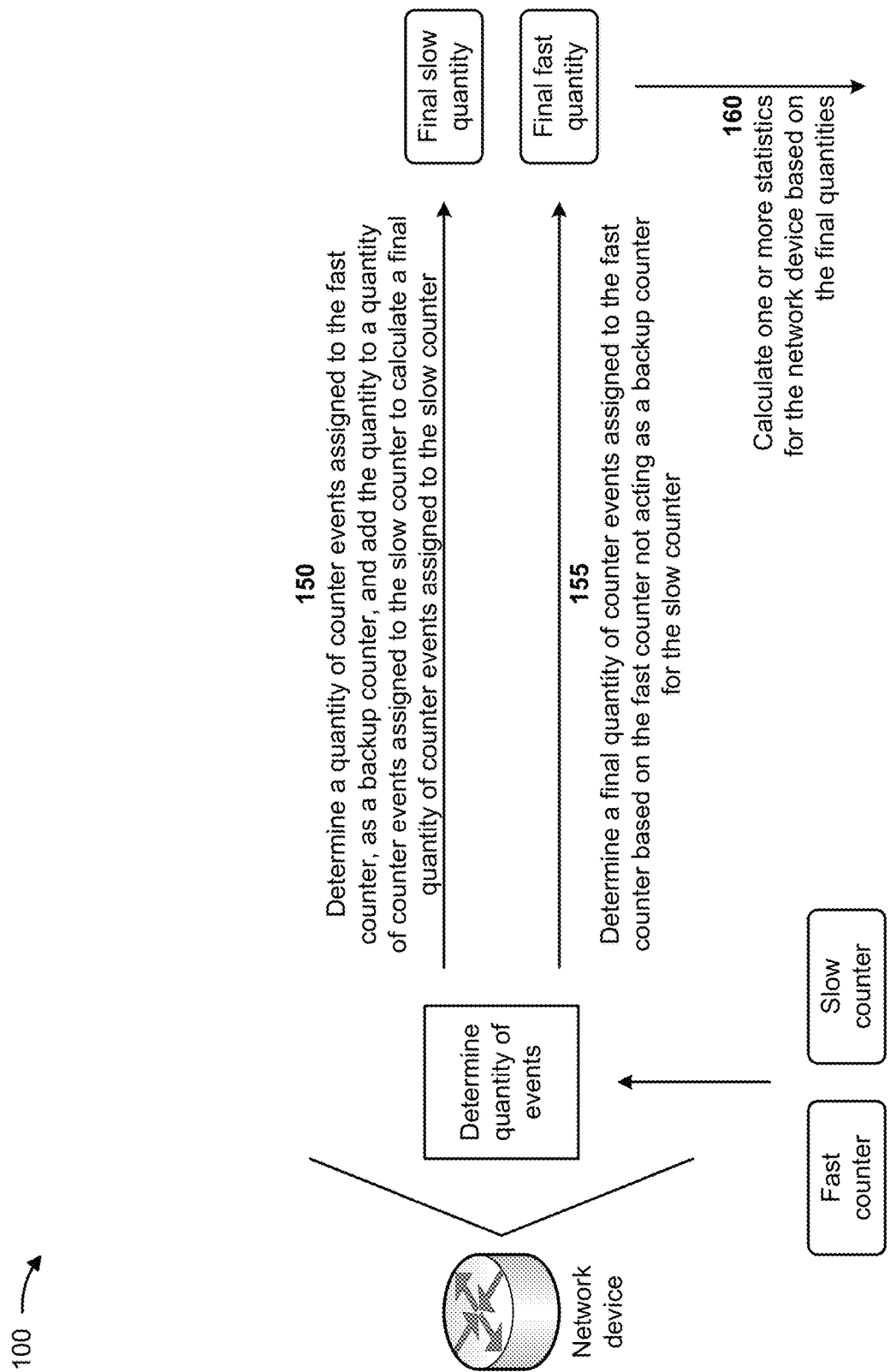

As shown in FIG. 1F, and by reference number 150, the network device may determine a quantity of counter events assigned to the fast counter, as a backup counter, and add the quantity to a quantity of counter events assigned to the slow counter to calculate a final quantity of counter events assigned to the slow counter. For example, based on receiving the request to calculate the one or more statistics of the network device, the network device may obtain the information identifying the quantity of counter events assigned to the fast counter, in a manner similar to the manner described above. Assume that the fast counter is configured to account for counter events for a plurality of slow counters.

In this regard, assume the quantity of counter events (assigned to the fast counter as a backup counter) accounts for counter events assigned due to the slow counter and a second slow counter being unable to perform updates. The network device may determine a ratio of the quantity of counter events (assigned to the slow counter) to a quantity of counter events assigned the second slow counter. The network device may obtain the quantity of counter events assigned to the second slow counter in a manner similar to the manner described above. The network device may use the ratio to identify a portion, of the quantity of counter events (assigned to the fast counter), that is to be added to the quantity of counter events assigned to the slow counter.

As an example, assume that the quantity of counter events (assigned to the fast counter) is three hundred (300) counter events, that the quantity of counter events (assigned to the slow counter) is two thousand (2000) counter events, that the quantity of counter events (assigned to the second slow counter) is one thousand (1000) counter events. The network device may determine a ratio of two (2) to one (1) based on two thousand (2000) counter events (assigned to the slow counter) and one thousand (1000) counter events (assigned to the second slow counter). Accordingly, the network device may apply the ratio to the three hundred (300) counter events (assigned to the fast counter) and determine that two hundred (200) counter events (out of the three hundred (300) counter events assigned to the fast counter) are to be added to the quantity of counter events (assigned to the slow counter).

In some implementations, the algorithm discussed above assumes that a percentage of time that the fast counter is assigned to counter events associated with the slow counter is same as a percentage of time that the fast counter is assigned to counter events associated with the second slow counter. The above quantities of counter events and ratio are merely provided as examples. Other examples of quantities of counter events and ratio may be used in some situations.

As shown in FIG. 1F, and by reference number 155, the network device may determine a final quantity of counter events assigned to the fast counter based on the fast counter not acting as a backup counter for the slow counter. For example, the network device may determine a portion, of the quantity of counter events (assigned to the fast counter), that is to be added to the quantity of counter events assigned to the slow counter, as explained above. The network device may obtain (e.g., from the memory associated with the fast counter) information identifying the quantity of packets (that are dropped due to the queue size limitation) counted by the fast counter. The quantity of packets may correspond to a total quantity of counter events accounted for by the fast counter. The network device may subtract the portion from the total quantity of counter events to determine the final quantity of counter events assigned to the fast counter.

As shown in FIG. 1F, and by reference number 160, the network device may calculate one or more statistics for the network device based on the final quantities. For example, the network device may calculate a statistic associated with WRED dropped packets being satisfied based on the final quantity of counter events assigned to the slow counter. Additionally, or alternatively, the network device may calculate a statistic associated with packets that are dropped due to the queue size condition being satisfied based on the final quantity of counter events assigned to the fast counter.

As explained herein, the network device may utilize a fast counter in combination with one or more slow counters to deliver full performance while accurately accounting for the statistics associated with forwarded and dropped packets. The fast counter may act as a backup counter for the one or more slow counters and may prevent lost counter events. The fast counter may be perform an update (on behalf of the one or more slow counters) to account for counter events (e.g., that are supposed to be accounted for by the one or more slow counters) when the one or more slow counters are unable to perform updates (e.g., due to a backlog).

With the fast counter acting as the backup counter in this manner, the network device may conserve computing resources, network resources, and/or other resources that would have otherwise been used with respect to generating incorrect statistics (e.g., due to lost counter events), performing incorrect or unnecessary actions on the network device based on the incorrect statistics, taking actions to rectify the incorrect or unnecessary actions, among other examples.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
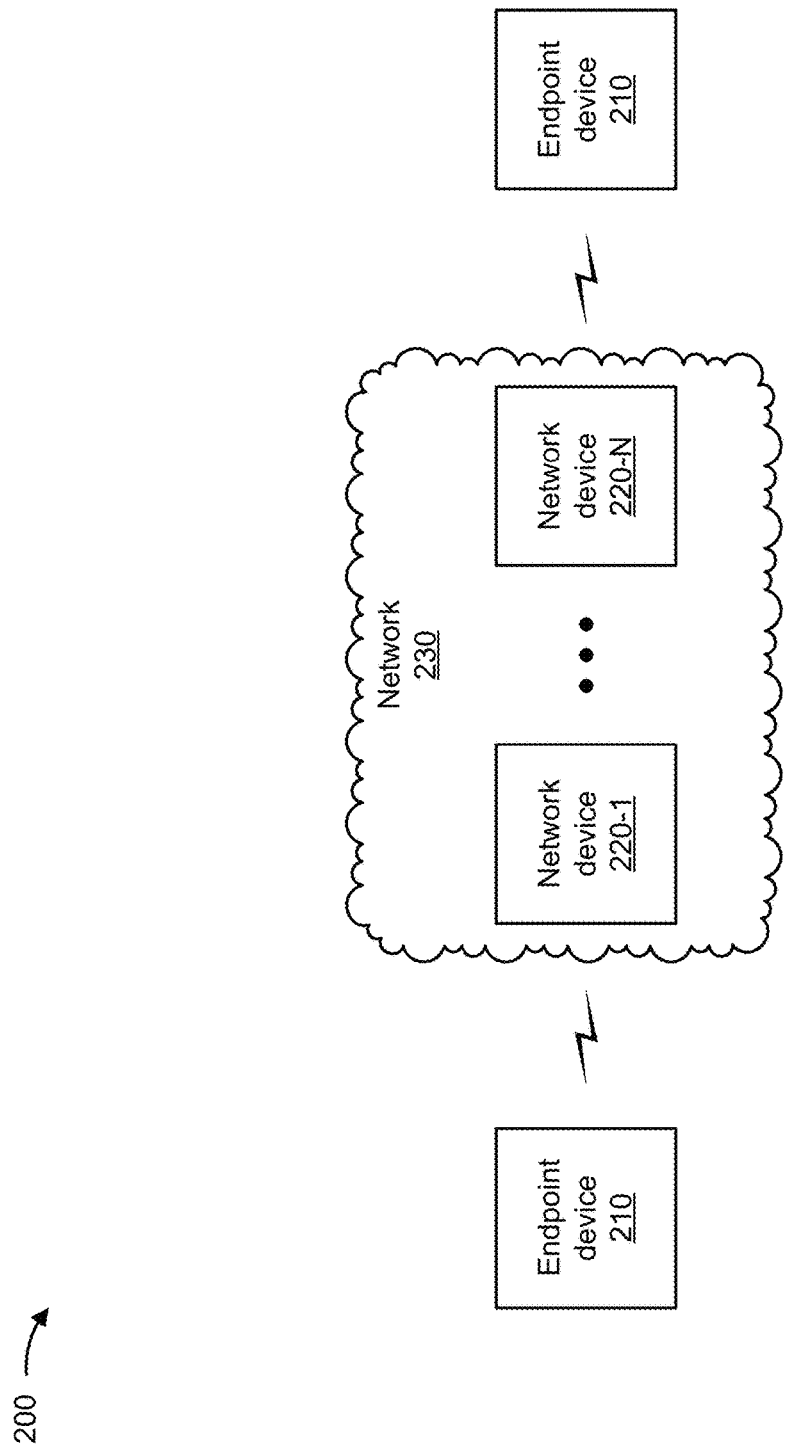
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
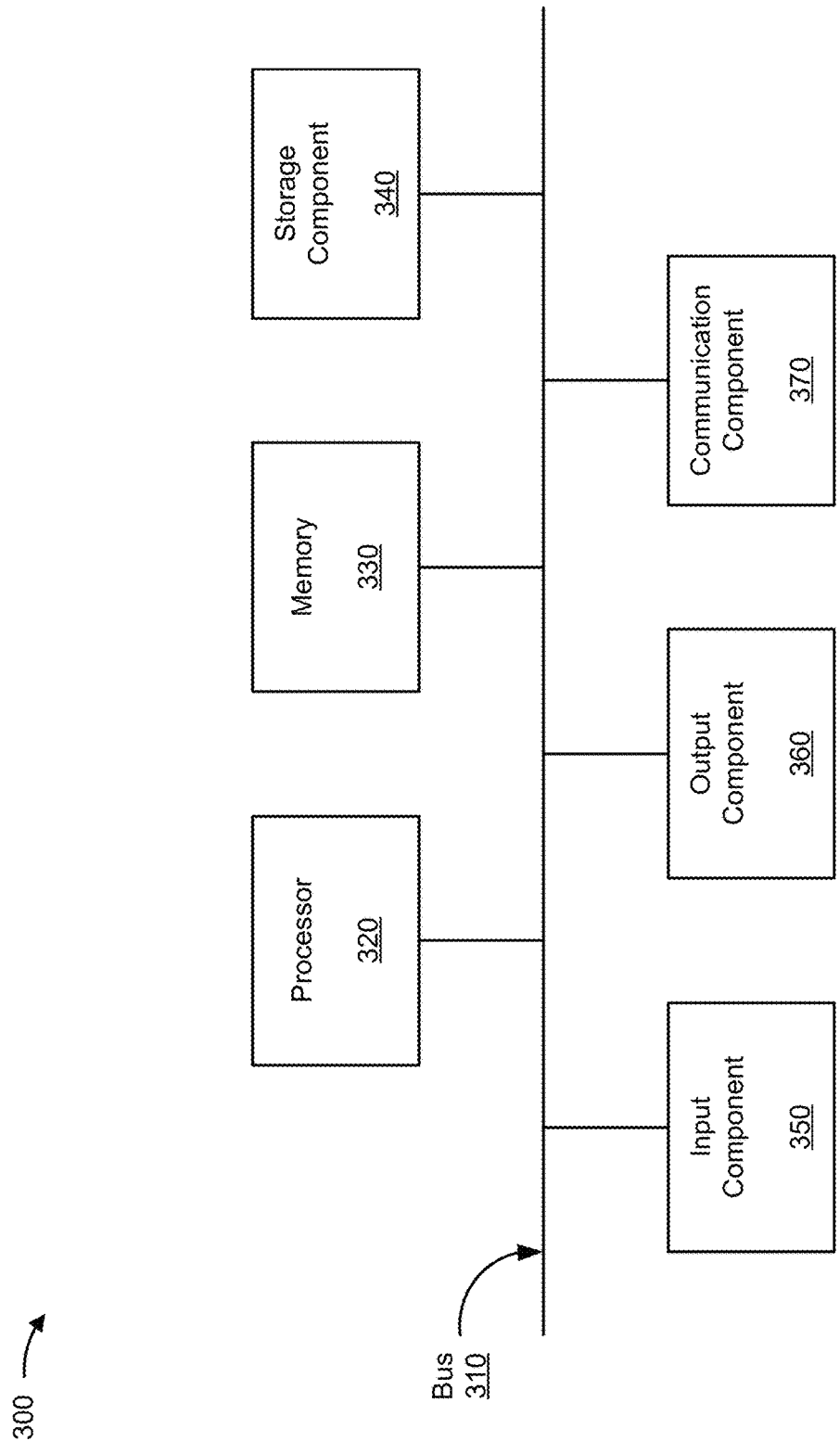
FIG. 3 is a diagram of example components of one or more devices of FIG. 2.

FIG. 3 is a diagram of example components of one or more devices of FIG. 2. The one or more devices may include a device 300, which may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
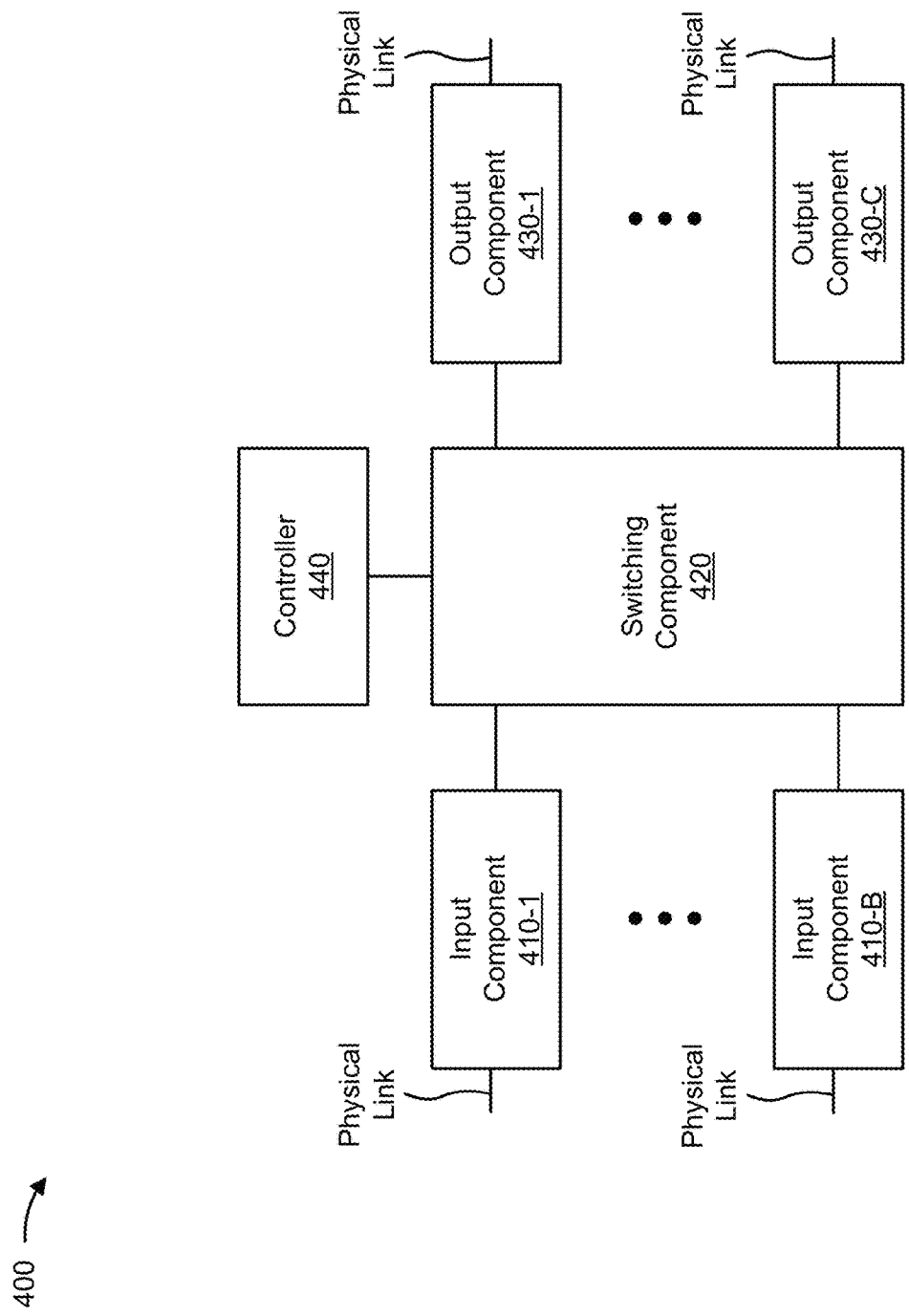
FIG. 4 is a diagram of example components of one or more devices of FIG. 2.

FIG. 4 is a diagram of example components one or more devices of FIG. 2. The one or more devices may include a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for determining network device statistics associated with fast counters and slow counters. In some implementations, one or more process blocks of FIG. 5 may be performed by a network device (e.g., network device 220). In some implementations, one or more process blocks of FIG. 5 may be performed by another device or a group of devices separate from or including the device, such as an endpoint device (e.g., endpoint device 210). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include receiving one or more packets (block 510). For example, the network device may receive one or more packets, as described above.

As further shown in FIG. 5, process 500 may include determining a flow control parameter, a rate limiting parameter, and a statistical sampling parameter associated with a slow counter of the network device (block 520). For example, the network device may determine a flow control parameter, a rate limiting parameter, and a statistical sampling parameter associated with a slow counter of the network device, as described above.

As further shown in FIG. 5, process 500 may include determining whether the flow control parameter satisfies a first threshold, whether the rate limiting parameter satisfies a second threshold, and whether the statistical sampling parameter satisfies a third threshold (block 530). For example, the network device may determine whether the flow control parameter satisfies a first threshold, whether the rate limiting parameter satisfies a second threshold, and whether the statistical sampling parameter satisfies a third threshold, as described above.

As further shown in FIG. 5, process 500 may include identifying a counter event associated with one of the one or more packets (block 540). For example, the network device may identify a counter event associated with one of the one or more packets, as described above.

As further shown in FIG. 5, process 500 may include selectively assigning the counter event to a fast counter of the network device or to the slow counter, wherein the counter event is assigned to the fast counter based on at least one of the first threshold, the second threshold, or the third threshold being satisfied, or the counter event is assigned to the slow counter based on none of the first threshold, the second threshold, and the third threshold being satisfied (block 550). For example, the network device may selectively assign the counter event to a fast counter of the network device or to the slow counter. In some implementations, the counter event is assigned to the fast counter based on at least one of the first threshold, the second threshold, or the third threshold being satisfied, or the counter event is assigned to the slow counter based on none of the first threshold, the second threshold, and the third threshold being satisfied, as described above.

Process 500 may include additional implementations, such as any single implementation or any combination of implementations described below and/or in connection with one or more other processes described elsewhere herein.

In a first implementation, process 500 includes determining a first quantity of counter events assigned to the fast counter, adding the first quantity to a second quantity of counter events assigned to the slow counter to calculate a final quantity of counter events assigned to the slow counter, and calculating one or more statistics for the network device based on the final quantity.

In a second implementation, alone or in combination with the first implementation, the one or more statistics relate to one or more of a statistic associated with the one or more packets that are dropped by the network device, or a statistic associated with the one or more packets that are forwarded by the network device.

In a third implementation, alone or in combination with one or more of the first and second implementations, process 500 includes determining a quantity of counter events assigned to the slow counter based on assignment probabilities associated with the fast counter and the slow counter, and calculating one or more statistics for the network device based on the quantity.

In a fourth implementation, alone or in combination with one or more of the first through third implementations, process 500 includes performing one or more actions on the network device based on the one or more statistics.

In a fifth implementation, alone or in combination with one or more of the first through fourth implementations, process 500 includes determining a first quantity of counter events assigned to the fast counter based on the fast counter acting as a backup counter for the slow counter, adding the first quantity to a second quantity of counter events assigned to the slow counter to calculate a final quantity of counter events assigned to the slow counter, and calculating one or more statistics for the network device based on the final quantity.

In a sixth implementation, alone or in combination with one or more of the first through fifth implementations, process 500 includes determining a quantity of counter events assigned to the fast counter based on the fast counter not acting as a backup counter for the slow counter, and calculating one or more statistics for the network device based on the quantity.

In a seventh implementation, alone or in combination with one or more of the first through sixth implementations, the plurality of packets includes one or more of a packet that is an explicit congestion notification marked and forwarded by the network device, a packet that is dropped by the network device based on per-color weighted random early detection, or a packet that is dropped by the network device based on a queue size limitation.

In an eighth implementation, alone or in combination with one or more of the first through seventh implementations, the slow counter includes a dynamic random-access memory and the fast counter includes a static random-access memory.

In a ninth implementation, alone or in combination with one or more of the first through eighth implementations, the flow control parameter is associated with the slow counter being unable to satisfy a counter rate, the rate limiting parameter is associated with the slow counter being unable to satisfy an update rate, and the statistical sampling parameter is associated with a random number and a sample probability.

In a tenth implementation, alone or in combination with one or more of the first through ninth implementations, process 500 includes calculating one or more statistics for the network device based on selectively assigning the plurality of counter events to the fast counter or to the slow counter, and performing one or more actions on the network device based on the one or more statistics.

In an eleventh implementation, alone or in combination with one or more of the first through tenth implementations, the fast counter is a backup counter for the slow counter and is a designated counter for specific counter events.

In a twelfth implementation, alone or in combination with one or more of the first through eleventh implementations, process 500 includes adding, based on one of the plurality of counter events being assigned to the fast counter, a value of one to a quantity of the plurality of counter events assigned to the slow counter to calculate a final quantity of the plurality of counter events assigned to the slow counter, and calculating one or more statistics for the network device based on the final quantity.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, one or more packets;
   determining, by the network device, a flow control parameter, a rate limiting parameter, and a statistical sampling parameter associated with a slow counter of the network device;
   determining, by the network device, whether the flow control parameter satisfies a first threshold, whether the rate limiting parameter satisfies a second threshold, and whether the statistical sampling parameter satisfies a third threshold;
   identifying, by the network device, a counter event associated with one of the one or more packets;
   selectively assigning, by the network device, the counter event to a fast counter of the network device or to the slow counter, wherein:
      the counter event is assigned to the fast counter based on at least one of the first threshold, the second threshold, or the third threshold being satisfied; or
      the counter event is assigned to the slow counter based on none of the first threshold, the second threshold, and the third threshold being satisfied;
   determining, by the network device, a quantity of counter events assigned to the slow counter based on the fast counter and the slow counter; and
   calculating, by the network device, one or more statistics for the network device based on the quantity of counter events assigned to the slow counter.

2. The method of claim 1, wherein the quantity of counter events assigned to the slow counter is a final quantity of counter events assigned to the slow counter, and
   further comprising:
   determining a first quantity of counter events assigned to the fast counter;
   wherein determining the quantity of counter events assigned to the slow counter comprises:
      adding the first quantity of counter events assigned to the slow counter to a second quantity of counter events assigned to the slow counter to calculate the final quantity; and
   wherein calculating the one or more statistics for the network device comprises:
      calculating the one or more statistics for the network device based on the final quantity.

3. The method of claim 1, wherein the one or more statistics relate to one or more of:
   a statistic associated with the one or more packets that are dropped by the network device, or
   a statistic associated with the one or more packets that are forwarded by the network device.

4. The method of claim 1,
   wherein determining the quantity of counter events assigned to the slow counter comprises:
      determining the quantity of counter events assigned to the slow counter based on assignment probabilities associated with the fast counter and the slow counter; and
   wherein calculating the one or more statistics comprises:
      calculating the one or more statistics for the network device based on the quantity of counter events assigned to the slow counter.

5. The method of claim 4, further comprising:
   performing one or more actions on the network device based on the one or more statistics.

6. The method of claim 1, where the quantity of counter events assigned to the slow counter is a final quantity of counter events assigned to the slow counter,
the method further comprising:
determining a first quantity of counter events assigned to the fast counter based on the fast counter acting as a backup counter for the slow counter;
wherein determining the quantity of counter events assigned to the slow counter comprises:
adding the first quantity of counter events assigned to the slow counter to a second quantity of counter events assigned to the slow counter to calculate the final quantity of counter events assigned to the slow counter; and
wherein calculating the one or more statistics comprises:
calculating the one or more statistics for the network device based on the final quantity.

7. The method of claim 1, further comprising:
determining another quantity of counter events assigned to the fast counter based on the fast counter not acting as a backup counter for the slow counter; and
wherein calculating the one or more statistics for the network device comprises:
calculating the one or more statistics for the network device based on the other quantity.

8. A network device, comprising:
one or more memories; and
one or more processors to:
receive a plurality of packets;
determine a flow control parameter, a rate limiting parameter, and a statistical sampling parameter associated with a slow counter of the network device;
determine whether the flow control parameter satisfies a first threshold, whether the rate limiting parameter satisfies a second threshold, and whether the statistical sampling parameter satisfies a third threshold;
identify a plurality of counter events associated with the plurality of packets;
selectively assign the plurality of counter events to a fast counter of the network device or to the slow counter, wherein:
one or more of the plurality of counter events are assigned to the fast counter based on at least one of the first threshold, the second threshold, or the third threshold being satisfied; or
one or more of the plurality of counter events are assigned to the slow counter based on none of the first threshold, the second threshold, and the third threshold being satisfied;
determine a quantity of counter events assigned to the slow counter based on the fast counter and the slow counter; and
calculate one or more statistics for the network device based on the quantity.

9. The network device of claim 8, wherein the plurality of packets includes one or more of:
a packet that is an explicit congestion notification marked and forwarded by the network device,
a packet that is dropped by the network device based on per-color weighted random early detection, or
a packet that is dropped by the network device based on a queue size limitation.

10. The network device of claim 8, wherein:
the slow counter includes a dynamic random-access memory, and
the fast counter includes a static random-access memory.

11. The network device of claim 8, wherein:
the flow control parameter is associated with the slow counter being unable to satisfy a rate at which counter events occur,
the rate limiting parameter is associated with the slow counter satisfying a rate limit, and
the statistical sampling parameter is associated with a sample probability.

12. The network device of claim 8,
wherein the one or more processors are further to:
calculate one or more other statistics for the network device based on selectively assigning the plurality of counter events to the fast counter or to the slow counter; and
perform one or more actions on the network device based on the one or more other statistics.

13. The network device of claim 8, wherein the fast counter is a backup counter for the slow counter and is a designated counter for specific counter events.

14. The network device of claim 8, where the quantity is a final quantity of counter events assigned to the slow counter,
wherein the one or more processors, to determine the quantity, are to:
add, based on one of the plurality of counter events being assigned to the fast counter, a value of one to another quantity of the plurality of counter events assigned to the slow counter to calculate the final quantity; and
wherein the one or more processors, to calculate the one or more statistics for the network device, are to:
calculate the one or more statistics for the network device based on the final quantity.

15. A non-transitory computer-readable medium storing a set of instructions, the set of instructions comprising:
one or more instructions that, when executed by one or more processors of a network device, cause the network device to:
receive one or more packets;
determine a flow control parameter, a rate limiting parameter, and a statistical sampling parameter associated with a first counter of the network device,
wherein the first counter includes a dynamic random-access memory;
determine whether the flow control parameter satisfies a first threshold, whether the rate limiting parameter satisfies a second threshold, and whether the statistical sampling parameter satisfies a third threshold;
identify a counter event associated with one of the one or more packets;
selectively assign the counter event to a second counter of the network device, that includes a static random-access memory, or to the first counter, wherein:
the counter event is assigned to the second counter based on at least one of the first threshold, the second threshold, or the third threshold being satisfied; or
the counter event is assigned to the first counter based on none of the first threshold, the second threshold, and the third threshold being satisfied;
determine a quantity of counter events assigned to the first counter based on the first counter and the second counter; and
calculate one or more statistics for the network device based on the quantity.

16. The non-transitory computer-readable medium of claim 15, wherein the one or more instructions further cause the network device to:

determine a first quantity of counter events assigned to the second counter;

wherein the one or more instructions, that cause the one or more processors to determine the quantity, cause the one or more processors to:

add the first quantity to a second quantity of counter events assigned to the first counter to calculate a final quantity of counter events assigned to the first counter; and wherein the one or more instructions, that cause the one or more processors to calculate the one or more statistics, cause the one or more processors to:

calculate the one or more statistics for the network device based on the final quantity.

17. The non-transitory computer-readable medium of claim 15, wherein the one or more instructions, that cause the one or more processors to determine the quantity of counter events assigned to the first counter, cause the one or more processors to:

determine the quantity based on respective assignment probabilities associated with the second counter and the first counter;

wherein the one or more instructions, that cause the one or more processors to calculate the one or more statistics, cause the one or more processors to:

calculate the one or more statistics for the network device based on the quantity; and wherein the one or more instructions further cause the network device to:

perform one or more actions on the network device based on the one or more statistics.

18. The non-transitory computer-readable medium of claim 15, wherein the quantity is a final quantity of counter events assigned to the first counter, wherein the one or more instructions further cause the network device to:

determine a first quantity of counter events assigned to the second counter based on the second counter acting as a backup counter for the first counter;

wherein the one or more instructions, that cause the one or more processors to determine the quantity of counter events assigned to the first counter, cause the one or more processors to:

add the first quantity to a second quantity of counter events assigned to the first counter to calculate the final quantity; and wherein the one or more instructions, that cause the one or more processors to calculate the one or more statistics, cause the one or more processors to:

calculate the one or more statistics for the network device based on the final quantity.

19. The non-transitory computer-readable medium of claim 15, wherein the one or more instructions further cause the network device to:

determine another quantity of counter events assigned to the second counter based on the second counter not acting as a backup counter for the first counter; and wherein the one or more instructions that cause the one or more processors to calculate the one or more statistics for the network device, cause the one or more processors to:

calculate one or more statistics for the network device based on the other quantity.

20. The non-transitory computer-readable medium of claim 15, wherein the one or more instructions further cause the network device to:

calculate one or more other statistics for the network device based on selectively assigning the counter event to the second counter or to the first counter; and perform one or more actions on the network device based on the one or more other statistics.

* * * * *

UNITED STATES PATENT AND TRADEMARK OFFICE
CERTIFICATE OF CORRECTION

| | |
|---|---|
| PATENT NO. | : 11,509,590 B2 |
| APPLICATION NO. | : 17/178033 |
| DATED | : November 22, 2022 |
| INVENTOR(S) | : Craig R. Frink et al. |

It is certified that error appears in the above-identified patent and that said Letters Patent is hereby corrected as shown below:

In the Claims

In Claim 6, Column 21, Lines 13-14, "…final quantity of counter events assigned to the slow counter; and…" should read as "…final quantity of the counter events; and…"

Signed and Sealed this
Twenty-first Day of February, 2023

Katherine Kelly Vidal
*Director of the United States Patent and Trademark Office*